(12) United States Patent
Meyer et al.

(10) Patent No.: US 11,378,153 B2
(45) Date of Patent: Jul. 5, 2022

(54) CENTRIFUGAL PENDULUM

(71) Applicant: AUDI AG, Ingolstadt (DE)

(72) Inventors: Herbert Meyer, Regensburg (DE); Thomas Fischer, Hitzhofen (DE); Andreas Bruns, Ingolstadt (DE); Peter Klumpp, Gaimersheim (DE); Jürgen Pfeiffer, Ingolstadt (DE); Michael Buck, Ingolstadt (DE); Thomas Forster, Greding (DE); Lutz Pahlich, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 207 days.

(21) Appl. No.: 16/772,616

(22) PCT Filed: Nov. 29, 2018

(86) PCT No.: PCT/EP2018/082979
§ 371 (c)(1),
(2) Date: Jun. 12, 2020

(87) PCT Pub. No.: WO2019/120920
PCT Pub. Date: Jun. 27, 2019

(65) Prior Publication Data
US 2021/0079974 A1  Mar. 18, 2021

(30) Foreign Application Priority Data
Dec. 20, 2017  (DE) ..................... 10 2017 223 450.4

(51) Int. Cl.
*F16F 15/14* (2006.01)
*F02B 75/06* (2006.01)

(52) U.S. Cl.
CPC ............ *F16F 15/145* (2013.01); *F02B 75/06* (2013.01); *F16F 2222/02* (2013.01);
(Continued)

(58) Field of Classification Search
CPC ........................ F16F 2222/02; F16F 2222/04
See application file for complete search history.

(56) References Cited

U.S. PATENT DOCUMENTS

2014/0305258 A1   10/2014   Bertram

FOREIGN PATENT DOCUMENTS

| CN | 104100676 A | 10/2014 |
| DE | 3806013 A1 | 9/1989 |

(Continued)

OTHER PUBLICATIONS

English-language translation of International Preliminary Report on Patentability dated Jul. 2, 2020, in corresponding International Application No. PCT/EP2018/082979; 8 pages.
(Continued)

*Primary Examiner* — Vicky A Johnson
(74) *Attorney, Agent, or Firm* — Maier & Maier, PLLC

(57) ABSTRACT

A centrifugal pendulum for damping rotational irregularities of a driveshaft of an internal combustion engine, having a carrier flange element connectable indirectly or directly to the driveshaft, and having multiple pendulum elements displaceable in relation to the carrier flange element, and guided via rollers in pendulum paths. Each pendulum element is displaceable in relation to the carrier flange element in the circumferential direction between a first and a second stop position. At least one friction element having defined thermal expansion properties, which are different in particular from the carrier flange element and/or the pendulum elements, is associated with the carrier flange element, and is designed and arranged in such a way that in a defined temperature range of the centrifugal pendulum, upon a movement of at least one pendulum element corresponding to the friction element in the direction of a stop position.

16 Claims, 8 Drawing Sheets

(52) U.S. Cl.
CPC ....... *F16F 2222/04* (2013.01); *F16F 2222/08* (2013.01); *F16F 2228/066* (2013.01); *F16F 2232/02* (2013.01)

(56) References Cited

FOREIGN PATENT DOCUMENTS

| | | | | |
|---|---|---|---|---|
| DE | 19930397 | A1 | 1/2001 | |
| DE | 102012214214 | A1 | 3/2013 | |
| DE | 102014217454 | A1 | 3/2015 | |
| DE | 102015205078 | A1 | 10/2015 | |
| DE | 102014215868 | A1 | 2/2016 | |
| DE | 102015206618 | A1 | 10/2016 | |
| DE | 102016222119 | A1 * | 5/2017 | ............ F16F 15/145 |
| DE | 102016222119 | A1 | 5/2017 | |
| DE | 102016205877 | A1 | 10/2017 | |
| DE | 102017108465 | A1 | 10/2017 | |
| DE | 102018110310 | A1 * | 10/2019 | ............. F16F 15/14 |
| FR | 3043157 | A1 | 5/2017 | |
| WO | WO-2018161992 | A1 * | 9/2018 | ............ F16F 15/145 |

OTHER PUBLICATIONS

Office Action dated Apr. 25, 2021 in corresponding Chinese Application No. 201880081726.9; 14 pages including English-language translation.

German Office Action dated Aug. 8, 2018 in corresponding application No. 10 2017 223 450.4; 17 pages.

International Search Report and Written Opinion dated Mar. 20, 2019 in corresponding application No. PCT/EP2018/082979; 19 pages.

* cited by examiner

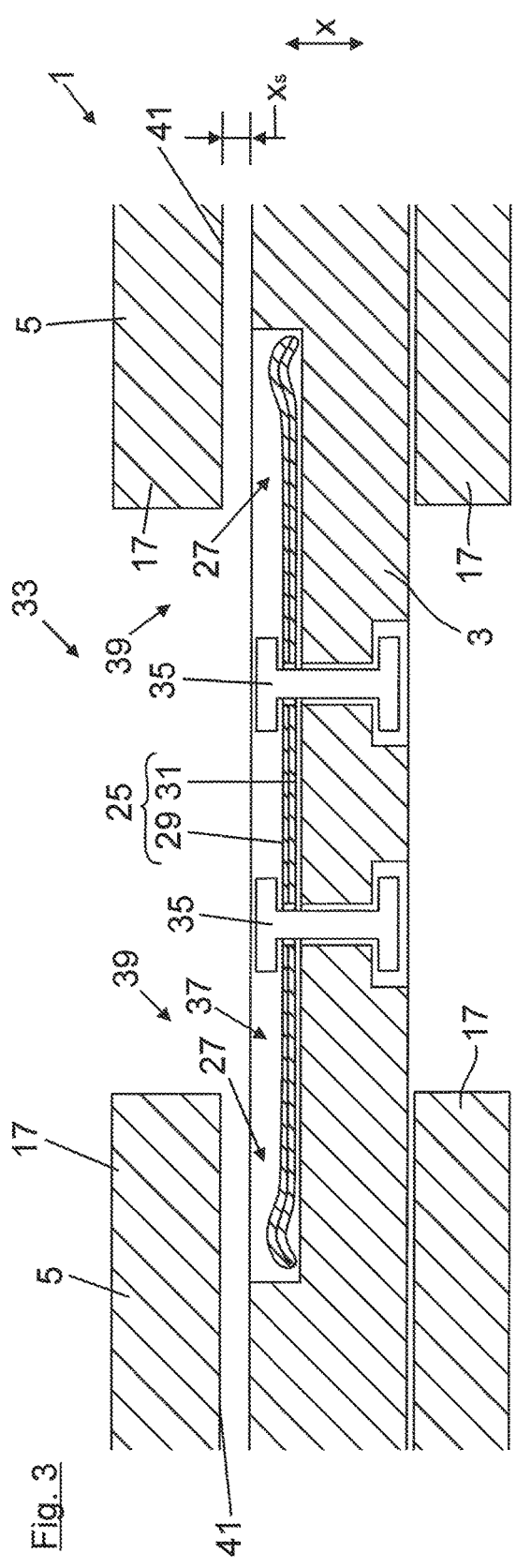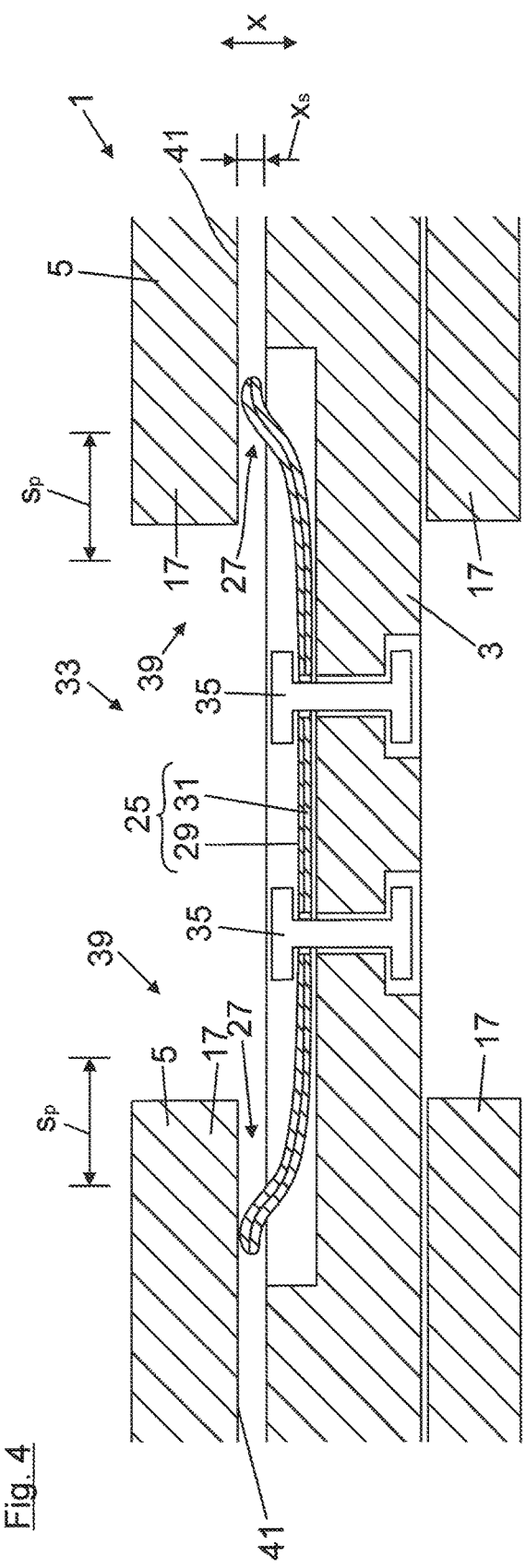

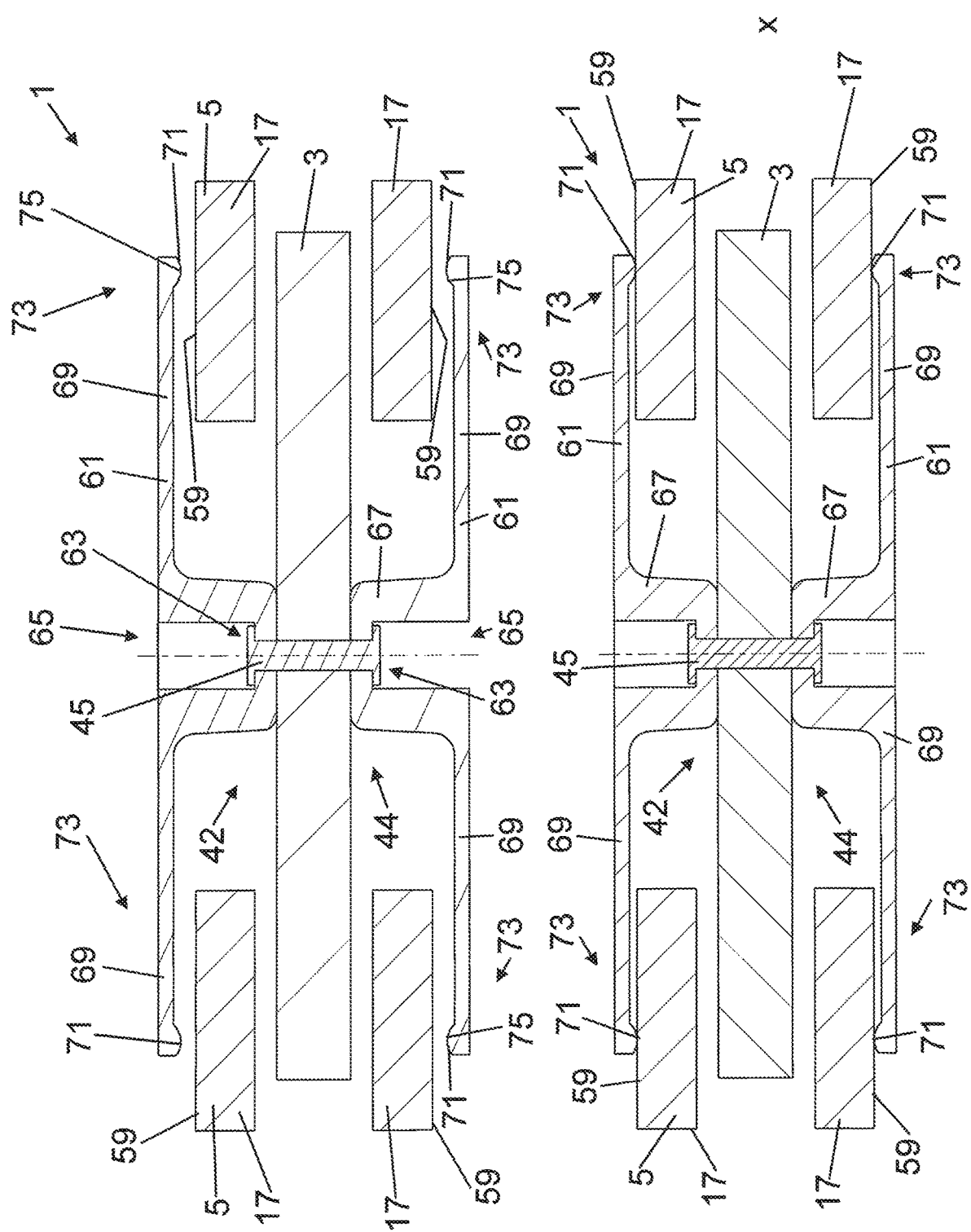

CENTRIFUGAL PENDULUM

FIELD

The invention relates to a centrifugal pendulum for damping rotational irregularities of a driveshaft of an internal combustion engine, a centrifugal pendulum for damping rotational irregularities of a driveshaft of an internal combustion engine, and a vehicle, in particular a motor vehicle, having one of the centrifugal pendulums.

BACKGROUND

Providing a centrifugal pendulum on a secondary side of a dual-mass flywheel of a motor vehicle drivetrain, by means of which rotational irregularities of a driveshaft of an internal combustion engine of the drivetrain can be damped or absorbed, + is known. Such a centrifugal pendulum typically has a carrier flange element connectable indirectly via the primary side of the dual-mass flywheel to the driveshaft of the internal combustion engine and multiple pendulum elements or pendulum masses, which are displaceable in relation to the carrier flange element and are guided via rollers in pendulum paths. In this case, each pendulum element can be displaced or moved in relation to the carrier flange element in the circumferential direction of the centrifugal pendulum between a first and a second stop position. By means of such a centrifugal pendulum, an occurrence of annoying humming and droning noises in the drivetrain can be effectively counteracted.

Furthermore, dual-mass flywheels typically have a grease filling or grease lubrication, by means of which an energy loss due to friction between a primary side and a secondary side of the dual-mass flywheel is counteracted. However, the viscosity of such a grease filling decreases with sinking temperature of the dual-mass flywheel, which has a negative effect on the property of the dual-mass flywheel as a decoupling element of rotational oscillations. In this case, the vibration angle increases on the secondary side of the dual-mass flywheel and thus the movement of the pendulum elements of the centrifugal pendulum also increases. The available pendulum travel is then frequently used up even at normal operating speeds upon increase of the motor load, in particular during a startup of the motor vehicle. Due to the increased movement of the pendulum elements, an annoying audible striking of the pendulum elements on the end stops thereof then also occurs at the normal operating speeds. Moreover, the function of the centrifugal pendulum can thus also be negatively affected, because the end stop of the respective pendulum mass is not embodied to be continuously resistant to all energy introductions.

To counteract such an increase of the pendulum element movement at low operating temperatures, for example, the idle speed of the internal combustion engine could be increased. However, this has a negative effect on the $CO_2$ balance and the fuel consumption of the internal combustion engine.

A centrifugal pendulum for damping rotational irregularities introduced via a driveshaft of a motor vehicle engine is disclosed in DE 10 2015 206 618 A1, in which a carrier flange connectable indirectly or directly to the driveshaft and multiple pendulum masses which can be displaced or oscillate in relation to the carrier flange are provided for generating a restoring torque oriented opposite to the rotational irregularity. In this case, a stop damper engaging in a tangential direction on a first pendulum mass and on a second pendulum mass is provided, which is formed in a specific design by a helical compression spring.

A centrifugal pendulum having such a compression spring as a stop damper is complex, however. Moreover, the movement of the pendulum elements is also damped in higher temperature ranges and thus in temperature ranges in which damping would not be required by means of such a compression spring, which can have a negative effect on the effect or the function of the centrifugal pendulum in the higher temperature ranges.

SUMMARY

The object of the invention is therefore to provide a centrifugal pendulum for damping or absorbing rotational irregularities of a driveshaft of an internal combustion engine, in which the pendulum behavior of the pendulum elements is improved in a simple and effective manner.

According to the invention, a centrifugal pendulum for damping rotational irregularities of a driveshaft of an internal combustion engine is proposed, having a carrier flange element connectable indirectly or directly to the driveshaft, and having multiple pendulum elements displaceable in relation to the carrier flange element, in particular guided via rollers in pendulum paths, wherein each pendulum element can be displaced in relation to the carrier flange element in the circumferential direction between a first and a second stop position.

According to the invention, at least one friction element having defined heat formation properties, which differ in particular from the carrier flange element and/or the pendulum element, is associated with the carrier flange element, in particular fixed on the carrier flange element, which is designed and arranged in such a way that in a defined temperature range of the centrifugal pendulum, upon a movement of at least one pendulum element corresponding to the friction element in the direction of one of its stop positions, this corresponding pendulum element comes into or is in contact with the friction element even before reaching the stop position and rubs against the friction element while dissipating pendulum element movement energy.

In this manner, the pendulum behavior of the pendulum elements is simply and effectively improved, since now the movement of the at least one pendulum element is damped and/or movement energy of this pendulum element is dissipated only in the relevant defined temperature range. In other, nonrelevant temperature ranges, the movement of the pendulum element is then not damped, so that the effect of the centrifugal pendulum is then not restricted here. Due to the association of the at least one friction element with the carrier flange element, the movement of the at least one responding pendulum element can be damped in dependence on the temperature here particularly simply or using a particularly simple structure and also particularly effectively.

The movement of the at least one corresponding pendulum element is preferably damped in the defined temperature range here by means of the friction element such that the corresponding pendulum element can no longer reach the stop position or the end stop.

In one preferred design of the centrifugal pendulum according to the invention, the friction element is designed and arranged in such a way that the at least one corresponding pendulum element comes into or is in contact with the friction element during a movement in the direction of the stop position only if the centrifugal pendulum falls below a defined temperature value. The movement of the at least one corresponding pendulum element is thus only damped by means of the friction element if this is required, in particular due to an excessively low viscosity of the grease filling of the dual-mass flywheel. It is preferably provided in this case that the defined temperature value is in a temperature range of 5° C. to 25° C., in particular approximately 10° C. Such damping preferably takes place in this case at least up to a defined lower operating temperature of the centrifugal pendulum or of the dual-mass flywheel comprising the centrifugal pendulum, in particular at least up to −30° C.

In one preferred specific design, the at least one friction element is designed and arranged in such a way that in the defined temperature range of the centrifugal pendulum, multiple, in particular two pendulum elements corresponding to the friction element, which in particular follow one another in the circumferential direction, are or can be brought into contact with the friction element even before reaching a respective stop position. The effectiveness of the at least one friction element is thus further enhanced.

The friction element is preferably arranged at least in regions in the circumferential direction of the centrifugal pendulum between two pendulum elements to implement damping of the movement energy of these two pendulum elements in a simple and effective manner. For a compact structure, it is moreover preferable if the at least one friction element does not protrude beyond the carrier flange element in the radial direction.

In one preferred specific design, the at least one friction element is formed by a bimetal strip. By means of such a bimetal strip, the movement of the at least one corresponding pendulum element can be damped easily and effectively in the defined temperature range. In this case, the free play between the pendulum elements and the carrier flange element can be bridged by means of the bimetal strip in the defined temperature range and the free movement of the pendulum element can be blocked or restricted by friction.

The bimetal strip is preferably secured or fastened here in a simple and functionally-reliable manner on a fastening region arranged centrally in the strip longitudinal direction, in particular rigidly and/or immovably. It is moreover preferably provided that the bimetal strip is secured on the carrier flange element on the central fastening region by means of multiple fasteners spaced apart from one another in the strip longitudinal direction, in particular screws and/or rivets, to reliably fasten the bimetal strip on the carrier flange element in a simple manner. Alternatively, however, it could also be provided that the bimetal strip is secured on the carrier flange element on the central fastening region by means of multiple fasteners spaced apart from one another in the strip transverse direction.

In one preferred specific design, the bimetal strip is formed U-shaped on a central region in the strip longitudinal direction, viewed in cross section in the strip longitudinal direction, wherein the bimetal strip is in a planar contact connection to the carrier flange element with a U base of this region, wherein each outer region of the bimetal strip located outside the central U-shaped region is or can be brought into contact, in particular with an outer end region in the strip longitudinal direction, with an outer wall, facing away from the carrier flange element, of a corresponding pendulum element when the centrifugal pendulum is in the defined temperature range. The bimetal strip is thus formed simply and particularly effectively.

In an alternative design, the bimetal strip, if the centrifugal pendulum is not in the defined temperature range, is formed extending linearly and/or in planar contact with the carrier flange element at least up to the outer end regions of the bimetal strip in the strip longitudinal direction, viewed in cross section in the strip longitudinal direction. In this manner, a particularly compact structure is implemented when the centrifugal pendulum is in the defined temperature range.

In this design, it is preferably provided that if the centrifugal pendulum is in the defined temperature range, outer regions of the bimetal strip located outside the central fastening region of the bimetal strip in the strip longitudinal direction are bent up and/or raised off of the carrier flange element in such a way that each outer region is or can be brought into contact, in particular with an outer end region in the strip longitudinal order, with an inner wall, facing toward the carrier flange element, of a corresponding pendulum element. The movement of the at least one corresponding element can thus be damped simply and effectively by means of the bimetal strip in the defined temperature range.

Preferably, at least one outer end region of the bimetal strip has a curved and/or C-shaped and/or S-shaped profile viewed in cross section in the strip longitudinal direction. Tilting of the bimetal strip with the corresponding pendulum element is thus effectively counteracted. Moreover, a defined contact between the bimetal strip and the corresponding pendulum element can thus also be reliably ensured.

The bimetal strip is preferably accommodated and/or arranged at least in regions in a recess or depression, which is not continuous in particular, of the carrier flange element in the carrier flange element thickness direction. A particularly compact structure is implemented by this countersunk arrangement of the bimetal strip. Moreover, a supporting effect in the case of centrifugal force influence due to higher (non-harmful) speeds can thus also be achieved. It is preferably provided in this case that if the centrifugal pendulum is not in the defined temperature range, the bimetal strip is completely accommodated and/or arranged in this recess at least up to outer end regions in the strip longitudinal direction.

Alternatively to the design as a bimetal strip, the at least one friction element could also be formed by spring sheet steel, which suddenly or discontinuously changes its shape and/or geometry at a defined switchover temperature according to the principle of a so-called "clicker". In this case, the friction element can then always have a first defined shape at a lower temperature than the switchover temperature, while the friction element always has a second defined shape different from the first shape at a higher temperature than the switchover temperature.

Alternatively to the design as a bimetal strip or "clicker", the at least one friction element can also be formed by a friction element having a defined high coefficient of thermal expansion.

In one preferred specific design, this friction element then has a higher coefficient of thermal expansion than the at least one corresponding pendulum element and/or than the carrier flange element to make the friction element effective and functionally reliable. The at least one friction element can be manufactured from a plastic material for an effective or simple structure.

In one preferred design, the friction element is secured on the carrier flange element on a fastening region, in particular rigidly and/or immovably, wherein the friction element comprises at least one arm or friction arm, protruding from the fastening region in the circumferential direction of the centrifugal pendulum, having a friction wall region, with which an outer wall of a corresponding pendulum element facing away from the carrier flange element is or can be brought into contact when the centrifugal pendulum is in the defined temperature range. The at least one friction element can thus be made simple and effective.

The friction wall region is preferably arranged here on an outer edge region of the friction arm viewed in the circumferential direction of the centrifugal pendulum. Furthermore, the friction wall region is preferably formed by a bulge, which is crowned in particular, of the friction arm.

In one preferred specific design, the friction element is formed essentially L-shaped or T-shaped in cross section, in particular continuously.

In one preferred design it is furthermore provided that, viewed in the thickness direction of the carrier flange element, one friction element is arranged on each of opposing sides of the carrier flange element opposing one another. These friction elements, which are formed identically in particular, are preferably secured by means of at least one fastener, in particular by means of at least one rivet and/or at least one screw, on the carrier flange element, wherein the at least one fastener is guided, in particular with a defined gap spacing, both by the opposing friction elements and also by the carrier flange element. The friction elements can thus be fastened in a functionally reliable and cost-effective manner on the carrier flange element.

Furthermore, the friction element is preferably designed in such a way that the friction element, if the centrifugal pendulum is in the defined temperature range, is in contact with this pendulum element over the entire pendulum travel of a corresponding pendulum element. The friction element is thus effectively prevented from having to merge in at the corresponding pendulum element.

Furthermore, to achieve the above-mentioned object, a centrifugal pendulum for damping rotational irregularities of a driveshaft of an internal combustion engine is proposed according to claim 9, having a carrier flange element connectable indirectly or directly to the driveshaft and having multiple pendulum elements guided in relation to the carrier flange element, in particular via rollers in pendulum paths, wherein each pendulum element can be displaced in relation to the carrier flange element in the circumferential direction between a first and a second stop position. According to the invention, at least one friction element having defined thermal expansion properties, which differ in particular from the carrier flange element and/or the pendulum element, is associated with at least one pendulum element, which friction element is designed and arranged in such a way that the pendulum element comes into contact using the pendulum-element-side friction element with the carrier flange element in a defined temperature range of the centrifugal pendulum during a movement in the direction of one of its stop positions even before reaching this stop position and rubs against the carrier flange element with the friction element while dissipating pendulum element movement energy.

By associating the friction element with the at least one pendulum element, the movement of the at least one pendulum element can also be damped effectively and simply in a temperature-dependent manner.

It is preferably provided in this case that the friction element is designed and arranged in such a way that the pendulum element only comes into contact with the carrier flange element using the friction element during a movement in the direction of the stop position when the centrifugal pendulum falls below a defined temperature value. It is preferably provided here that the defined temperature value is in a temperature range of 5° C. to 25° C., in particular approximately 10° C.

The friction element can also be formed in this case by a bimetal strip or by a friction element having a defined high coefficient of thermal expansion.

Furthermore, a vehicle, in particular a motor vehicle, having one of the centrifugal pendulums according to the invention is also claimed. The advantages resulting therefrom are identical to the above-described advantages of the centrifugal pendulum according to the invention, so that they will not be repeated at this point. It is preferably provided in this case that the centrifugal pendulum is connected indirectly or directly to a driveshaft of an internal combustion engine as a drive engine of the motor vehicle.

The invention and its advantageous embodiments and/or refinements and also the advantages thereof are explained in greater detail hereinafter solely by way of example with the aid of drawings.

BRIEF DESCRIPTION OF THE DRAWINGS

In the figures:

FIG. 3 shows a sectional illustration along section line A-A from FIG. 2 having the centrifugal pendulum in a first temperature range;

FIG. 4 shows the centrifugal pendulum in a second temperature range in an illustration corresponding to FIG. 3;

FIG. 9a shows sectional illustrations along section line C-C from FIG. 8.

FIG. 9b shows sectional illustrations along section line C-C from FIG. 8.

DETAILED DESCRIPTION

Figure 1:
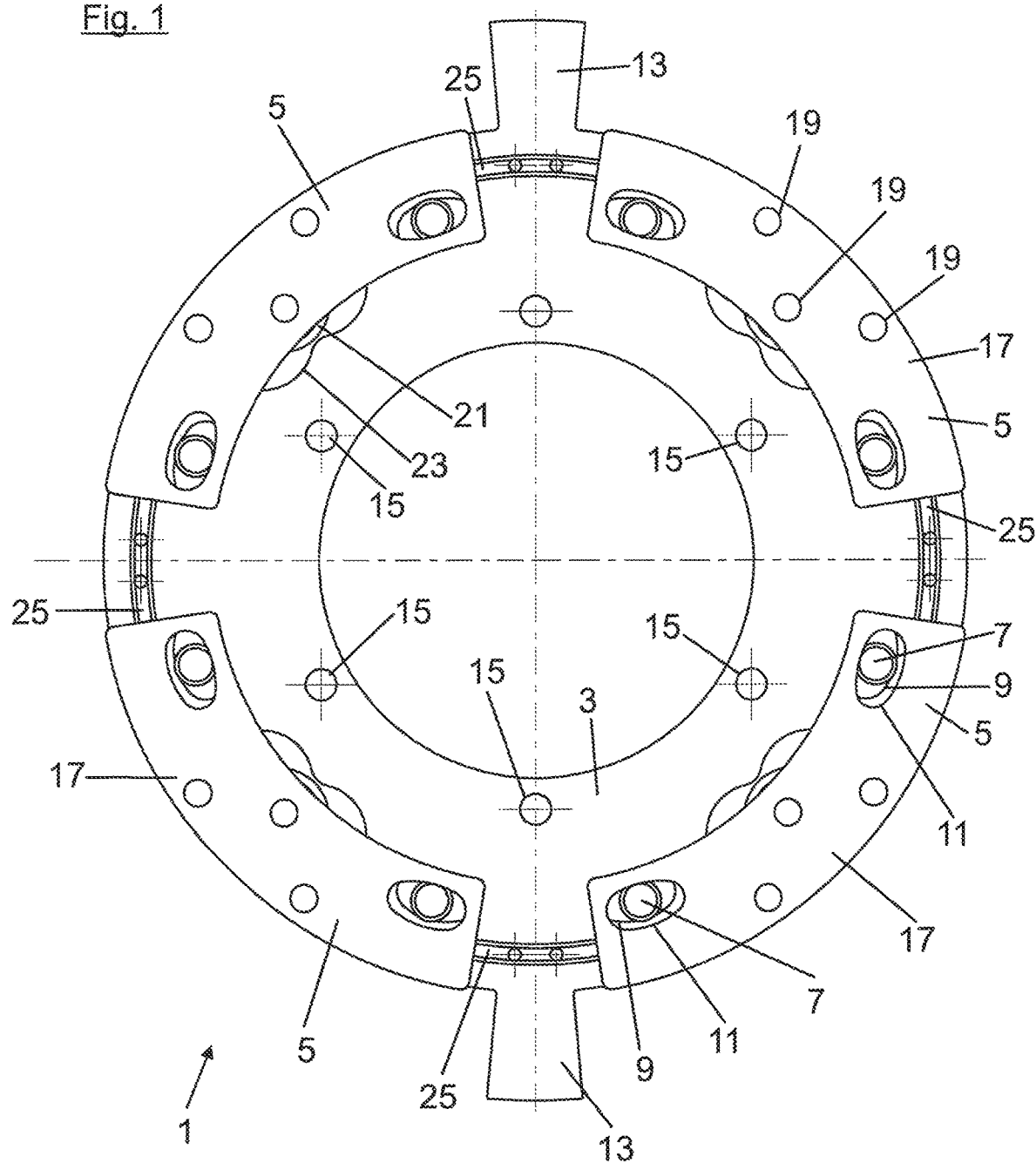
FIG. 1 shows a centrifugal pendulum according to the invention in an illustration from above.

A centrifugal pendulum 1 according to the invention is shown in an illustration from above or in a top view in FIG. 1. This centrifugal pendulum 1 is, in the installed state, a component of a secondary side of a dual-mass flywheel (not shown further here). The centrifugal pendulum 1 comprises a carrier flange element 3 and multiple, four by way of example here, pendulum elements 5 which can be displaced or oscillated in relation to the carrier flange element 3. Each pendulum element 5 is guided here by means of multiple, two by way of example here, rollers 7, wherein each roller 7 is guided here so it can roll in a pendulum path 9 of the carrier flange element and also in runways 11 of the respective pendulum element 5 opposing one another in the centrifugal pendulum axial direction x (FIG. 3). The pendulum paths 9, 11 are formed ellipsoidal here by way of example.

Furthermore, the carrier flange element 3 is essentially formed here as a circular ring disk and comprises two webs 13, which protrude radially outward and oppose one another, by way of example here as drivers for helical springs, forming a rotational oscillation damper, of the dual-mass flywheel. Moreover, the carrier flange element 3 comprises multiple holes 15 on the radial interior here, by means of which the centrifugal pendulum 1 can be connected to a secondary oscillating mass of the dual-mass flywheel or can be flanged onto the secondary oscillating mass. The pendulum elements 5 are moreover arranged on the radial outside on the carrier flange element 3. Furthermore, the pendulum elements 5 are distributed uniformly along the carrier flange element 3 here, viewed in the circumferential direction U of the centrifugal pendulum 1, and are also arranged spaced apart from one another.

Each pendulum element 5 comprises by way of example here two plate bodies 17 (FIG. 3) in the form of ring segments opposite to one another in the axial direction x, which are rigidly connected to one another here by means of multiple rivet connections 19. Each plate body 17 or each pendulum element 5 extends over a circumferential angle of approximately 80° here in the circumferential direction U. According to FIG. 1, each pendulum element 5 moreover comprises a stop element 21 arranged between the respective plate bodies 17 in the axial direction x here, which is guided in a corresponding stop path 23 of the carrier flange element 3, so that each pendulum element 5 can be displaced in the circumferential direction U between a first and a second stop position in relation to the carrier flange element 3.

As is furthermore apparent from FIG. 1, furthermore a friction element 25 formed here as a bimetal strip, which is associated with the carrier flange element 3 and/or is secured on the carrier flange element 3, extends in each case here between the pendulum elements 5, viewed in the circumferential direction U. The bimetal strips 25 are only arranged here on one side of the carrier element 3, viewed in the axial direction x or in the carrier flange element thickness direction, so that the centrifugal pendulum 1 comprises a total of four bimetal strips 25 here.

Figure 2:
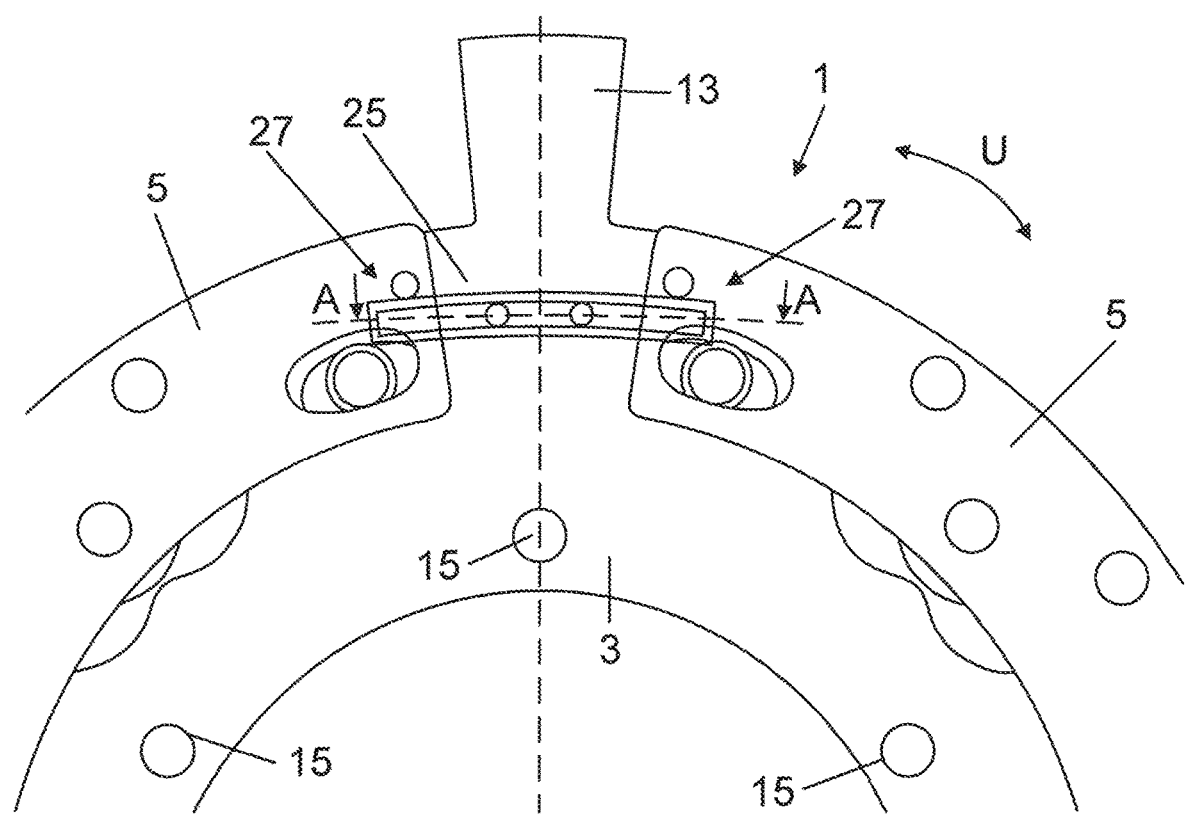
FIG. 2 shows a part of the centrifugal pendulum in an enlarged view from above.

According to FIG. 2, each bimetal strip 25 protrudes in with its end regions 27 below the two associated or corresponding pendulum elements 5. Moreover, the long outer sides of the bimetal strip 25 are curved identically to the carrier flange element 3 here. Furthermore, the bimetal strips 25 also do not protrude beyond the carrier flange element 3 in the radial direction here.

As is furthermore shown in FIGS. 3 and 4, the bimetal strip 25 comprises two layers 29, 31 made up of different metals, which have different coefficients of thermal expansion and can be connected to one another in a materially bonded or formfitting manner, for example. Moreover, the flat and oblong bimetal strip 25 is rigidly or immovably secured on the carrier flange element 3 here, for example, on a central fastening region 33 in the strip longitudinal direction. The securing or fastening is implemented here by way of example by means of multiple fasteners 35 spaced apart from one another in the strip longitudinal direction, for example, screws or rivets.

In FIG. 3, the bimetal strip 25 is moreover shown here in a base state or in a base shape, in which the bimetal strip 25 is found here by way of example when the bimetal strip 25 exceeds a defined temperature value, in particular approximately 10° C. In FIG. 4, the bimetal strip 25 is shown in a friction state or in a friction shape, in which the bimetal strip 25 is found here by way of example when the bimetal strip 25 falls below the defined temperature value.

In the basic state shown in FIG. 3, the bimetal strip 25 is formed linearly extending up to the outer end regions 27 in the strip longitudinal direction, viewed in the cross section in the strip longitudinal direction shown in FIG. 3, and is also in planar contact with the carrier flange element 3. Moreover, in the base state of the bimetal strip 25, each outer end region 27 of the bimetal strip 25 has an essentially C-shaped profile viewed in cross section in the strip longitudinal direction. Furthermore, the bimetal strip 25 is accommodated or arranged here in the base state completely in a non-continuous recess or depression of the carrier flange element 3 in the carrier flange element thickness direction.

In the friction state shown in FIG. 4, the outer regions 39 of the bimetal strip 25 located outside the central fastening region 33 of the bimetal strip 25 are bent up or curved and raised off of the carrier flange element 3 in such a way that these outer regions 39 are in contact using the end regions 27 with the inner walls 41 of the corresponding pendulum element 5 facing toward the carrier flange element 3. A free play $x_S$ between the respective pendulum element 5 and the carrier flange element 3 is thus bridged in the friction state by means of the bimetal strip 25. Moreover, the bimetal strip 25 found in the friction state is in contact using its end regions 27 with the corresponding pendulum elements 5 over the entire pendulum travel $s_P$ of the corresponding pendulum elements 5.

Each bimetal strip 25 is thus formed and arranged here in such a way that in the friction state shown in FIG. 4 or at a low temperature of the centrifugal pendulum 1, during a movement of the pendulum elements 5 corresponding to the bimetal strip 25 in the direction of one of the stop positions thereof or in the direction toward the bimetal strip 25, these corresponding pendulum elements 5 are in contact with the bimetal strip 25 before reaching this stop position and rub against the bimetal strip 25 while dissipating pendulum element movement energy. The movement of the pendulum elements 5 is thus effectively damped in this temperature range and the oscillating behavior of the centrifugal pendulum 1 is improved.

Figure 5A:
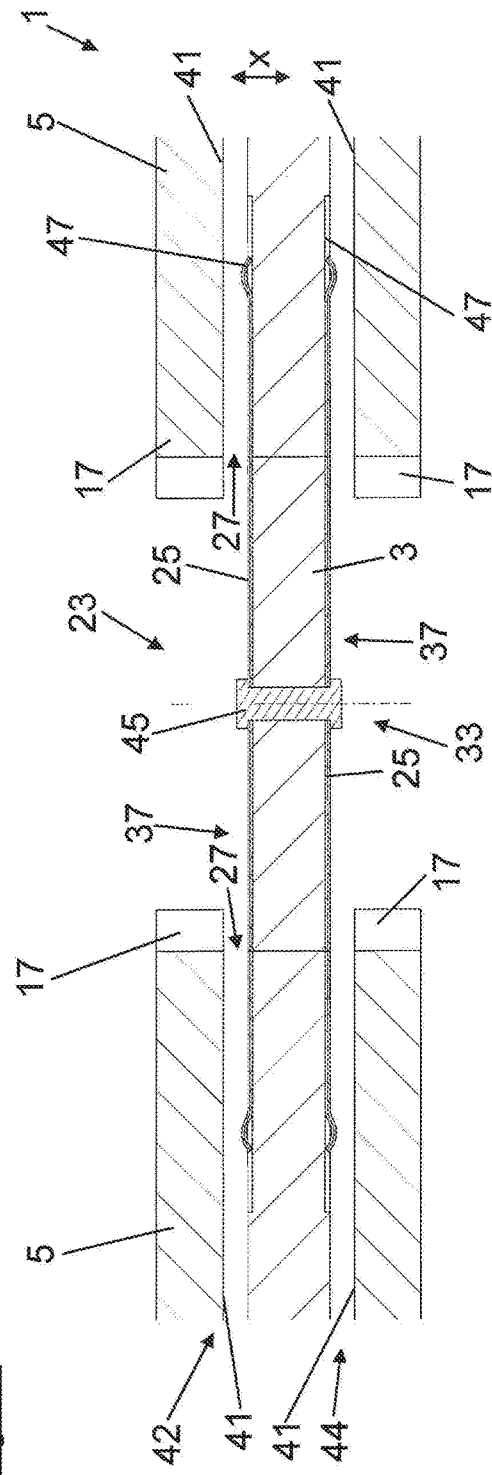
FIG. 5a shows a second embodiment of a centrifugal pendulum according to the invention in illustrations corresponding to FIGS. 3 and 4.
Figure 5B:
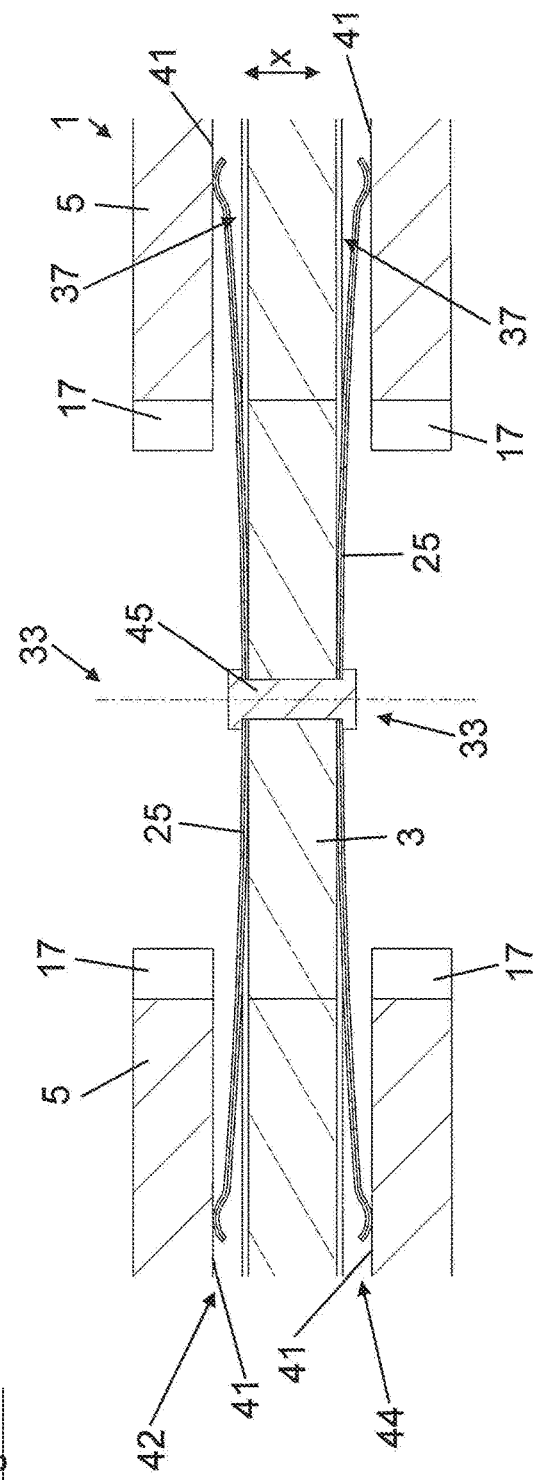
FIG. 5b shows a second embodiment of a centrifugal pendulum according to the invention in illustrations corresponding to FIGS. 3 and 4.

A second exemplary embodiment of a centrifugal pendulum 1 according to the invention is shown in FIGS. 5*a* and 5*b*. In comparison to the first exemplary embodiment shown in FIGS. 1 to 4, a bimetal strip 25 is arranged on each of opposing sides 42, 44 of the carrier flange element 3 opposing one another, viewed in the thickness direction of the carrier flange element 3, on the region of the centrifugal pendulum 1 shown in FIGS. 5*a* and 5*b*. The centrifugal pendulum 1 thus comprises a total of eight bimetal strips 25 here.

The bimetal strips 25 opposing one another are formed identically here and are secured by means of a single fastener 45, for example, a rivet and/or a screw, on the carrier flange element 3, wherein the fastener 45 is guided with a defined gap spacing both through the bimetal strips 25 opposing one another and also through the carrier flange element 3. In this case, side walls 47 of the carrier flange element 3 delimiting the respective recess 37 form a guide here for the respective bimetal strip 25, so that the respective bimetal strip 25 cannot twist. Moreover, the recesses or depressions 37 of the carrier flange element 3 are formed with a lesser depth here, for example, so that the bimetal strip 25 in the stowed state shown in FIG. 5a is completely arranged in the recess 37 only up to its outer end regions 27.

Figure 6:
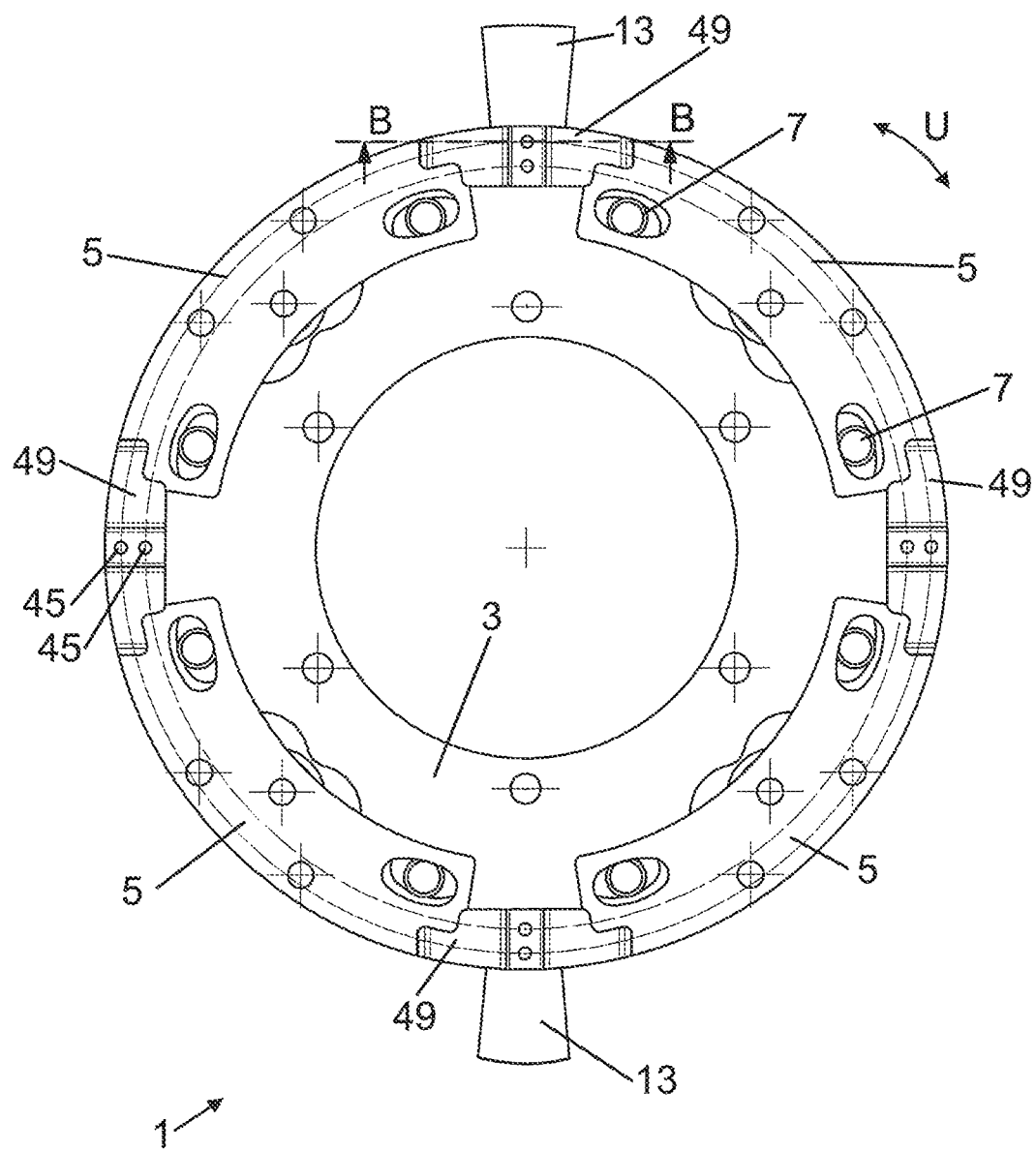
FIG. 6 shows a third embodiment of a centrifugal pendulum according to the invention in an illustration corresponding to FIG. 1.
Figure 7A:
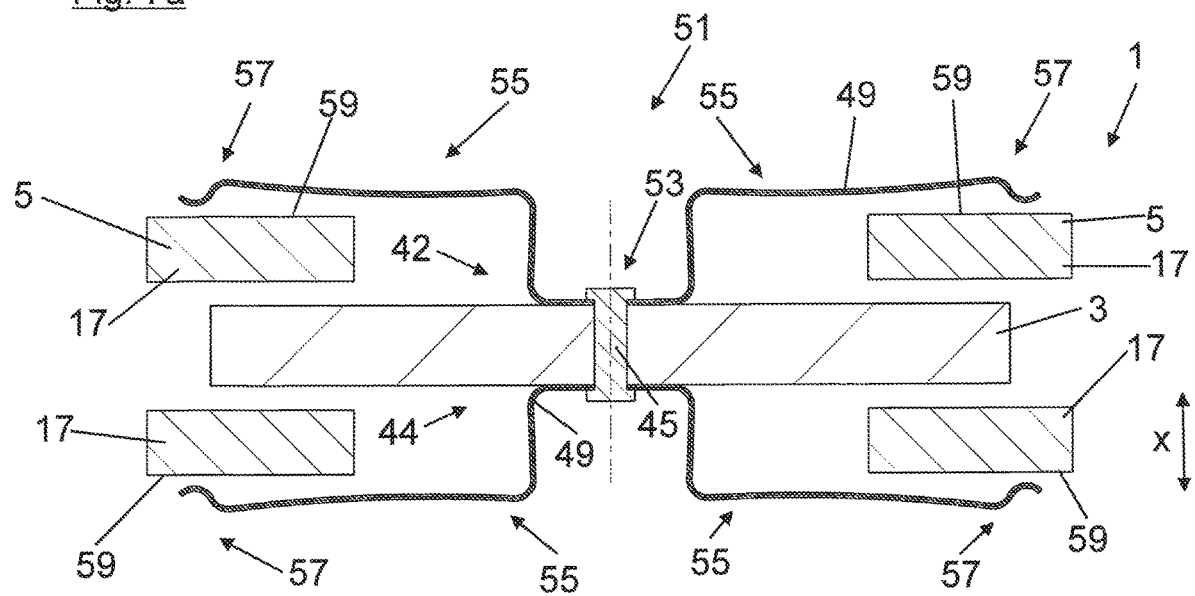
FIG. 7a shows sectional illustrations along section line B-B from FIG. 6.
Figure 7B:
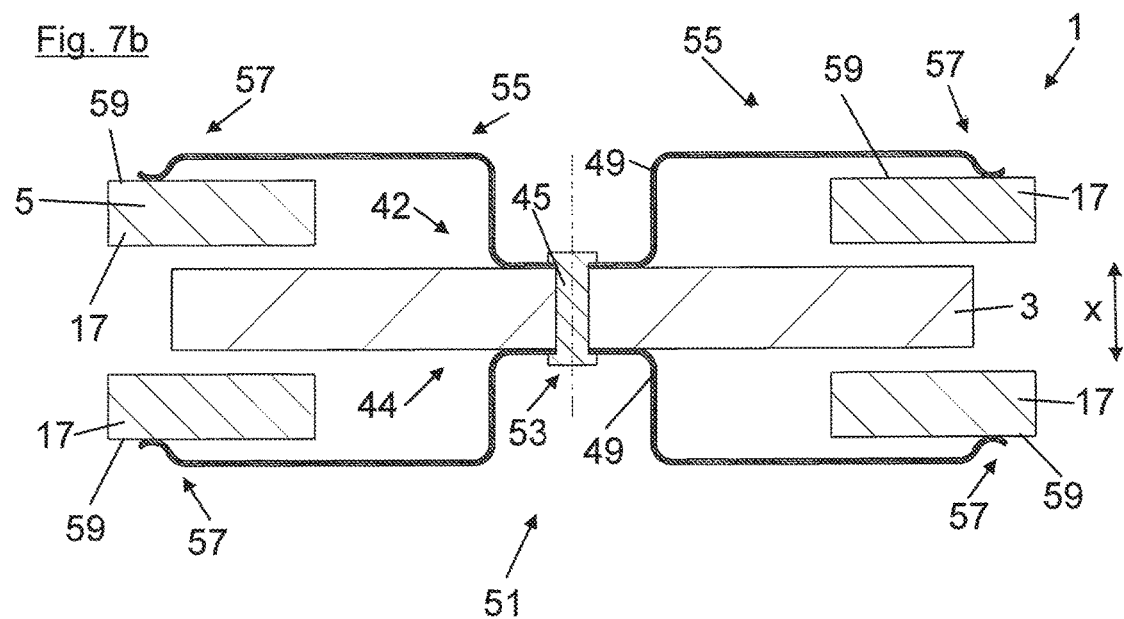
FIG. 7b shows sectional illustrations along section line B-B from FIG. 6.

A third exemplary embodiment of a centrifugal pendulum 1 according to the invention is shown in FIGS. 6, 7a, and 7b. In comparison to the exemplary embodiments shown in FIGS. 1 to 5, instead of the bimetal strips 25, bimetal strips 49 are provided here, which are formed wider than the bimetal strips 25 according to FIG. 6. Each bimetal strip extends radially inward here starting from a radial outer edge of the carrier flange element 3. Moreover, each bimetal strip 49, viewed in the radial direction of the centrifugal pendulum 1, tapers in steps inward here, so that the rollers 7 of the centrifugal pendulum 1 cannot strike against the bimetal strips 49 here.

According to FIGS. 7a and 7b, each bimetal strip 49 is formed U-shaped on a central region 51 in the strip longitudinal direction, viewed in cross section in the strip longitudinal direction. Each bimetal strip 49 is in a planar contact connection with the carrier flange element 3 here with a U base 53 of this region 51. In this case, as also in the exemplary embodiment according to FIG. 5, a bimetal strip 49 is arranged on each of the opposing sides 42, 44 of the carrier flange element 3 opposing one another viewed in the thickness direction of the carrier flange element 3. The identical bimetal strips 49 opposing one another are secured here by means of two fasteners 45 (FIG. 6) on the carrier flange element 3, wherein the fasteners 45 are guided with a defined gap spacing both through the opposing bimetal strips 49 and also through the carrier flange element 3. The fasteners 45 are arranged spaced apart from one another here in the strip transverse direction.

Furthermore, each bimetal strip 49 comprises outer regions 55, which adjoin the central U-shaped region 51 to the outside and are formed extending linearly here up to the outer end regions 57 of the bimetal strip 49, for example, in the friction state shown in FIG. 7b, viewed in cross section in the strip longitudinal direction, and extend spaced apart axially outside the pendulum element 5 with a defined axial spacing from the corresponding pendulum element 5. Moreover, in the friction state of the bimetal strip 49, each outer end region 57 has an S-shaped profile viewed in cross section in the strip longitudinal direction. Using these S-shaped end regions 57, the respective bimetal strip 49 is always in contact with the outer walls 59 of the corresponding pendulum elements 5 facing away from the carrier flange element 3 when the centrifugal pendulum 1 is in the friction state shown in FIG. 7b. Therefore, in this exemplary embodiment the respective bimetal strip 49 encloses the corresponding pendulum elements 5 from the outside.

In the base state shown in FIG. 7a, the outer regions 55 of the bimetal strip 49 located outside the central region 51 of the respective bimetal strip 49 are bent up or curved and raised off of the corresponding pendulum elements 5 in such a way that the outer regions 55 are no longer in contact using the end regions 57 thereof with the corresponding pendulum elements 5.

Figure 8:
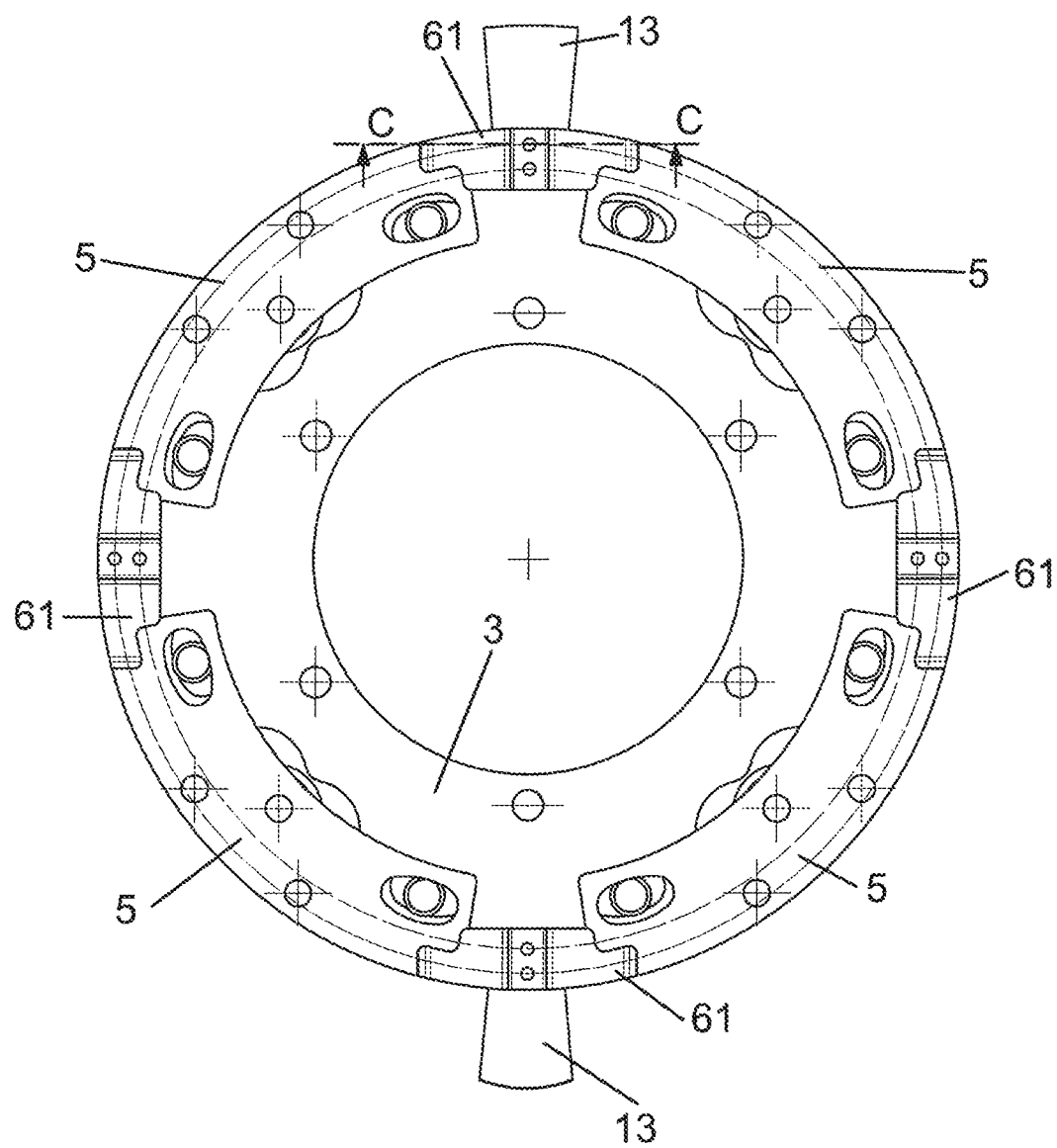
FIG. 8 shows a fourth embodiment of a centrifugal pendulum according to the invention in an illustration corresponding to FIG. 1.

A fourth exemplary embodiment of a centrifugal pendulum 1 according to the invention is shown in FIGS. 8, 9a, and 9b. In comparison to the exemplary embodiments shown in FIGS. 1 to 7, the centrifugal pendulum 1 does not have bimetal strips 25 as friction elements here. Instead, the centrifugal pendulum 1 comprises multiple friction elements 61 having a defined high coefficient of thermal expansion here. These friction elements 61 have a significantly higher coefficient of thermal expansion here than the pendulum elements 5 and the carrier flange element 3 and are manufactured here from a plastic material by way of example.

As is apparent from FIGS. 9a and 9b, a friction element 61 is again arranged here on each of opposing sides 42, 44 of the carrier flange element 3 opposing one another, viewed in the thickness direction of the carrier flange element 3. These opposing friction elements 61 are formed identically here and are secured in an identical manner as the bimetal strips 49 by means of two fastening elements 45 on the carrier flange element 3. Moreover, the end regions 63 of the fasteners 62 are arranged countersunk in a recess 65 of the respective friction element 61 here.

Furthermore, each friction element 61 is formed essentially T-shaped in cross section here. In this case, each friction element 61 is secured rigidly or immovably by means of the fasteners 62 on the carrier flange element 3 on a T-base 67 forming a fastening region. The T-base 67 is in planar contact with the carrier flange element 3 with its free end in this case. Moreover, each friction element 61 comprises two arms or friction arms 69 protruding from the fastening region 67 in opposing directions in the circumferential direction U of the centrifugal pendulum 1 here. Each arm 69 comprises a friction wall region 71 here. Each of these friction wall regions 71 is arranged in this case on an outer edge region 73 of the respective friction arm 69 viewed in the circumferential direction of the centrifugal pendulum 1 here and is formed by a crowned bay or bulge 75 of the respective friction arm 69.

In the base state of the friction elements 61 shown in FIG. 9a, the friction elements 61 are always in contact here using the friction wall regions 71 thereof with the outer walls 59 of the corresponding pendulum elements 5. In the friction state shown in FIG. 9b, the friction elements 61 are always out of contact using the friction wall regions 71 thereof with the outer walls 59 of the corresponding pendulum elements 5 or are spaced apart from the outer walls 59. The respective friction element 61 thus also encloses the corresponding pendulum elements 5 from the outside here.

The invention claimed is:

1. A centrifugal pendulum for damping rotational irregularities of a driveshaft of an internal combustion engine, comprising:
    a carrier flange element connectable indirectly or directly to the driveshaft, and
    multiple pendulum elements displaceable in relation to the carrier flange element and guided via rollers in pendulum paths,
    wherein each pendulum element is displaceable in relation to the carrier flange element in the circumferential direction between a first and a second stop position, and
    wherein at least one friction element having defined thermal expansion properties, which are different from the carrier flange element and/or the pendulum elements, is associated with the carrier flange element and is designed and arranged in such a way that in a defined temperature range of the centrifugal pendulum, upon a movement of at least one pendulum element corresponding to the friction element in the direction of a stop position, this corresponding pendulum element comes into or is in contact with the friction element before reaching the stop position, rubbing against the friction element while dissipating pendulum element movement energy.

2. The centrifugal pendulum as claimed in claim 1, wherein the friction element is designed and arranged in such a way that the at least one corresponding pendulum element, upon a movement in the direction of the stop position, only comes into or is in contact with the friction element if the centrifugal pendulum falls below a defined temperature value, and wherein the defined temperature value is in a temperature range of 5° C. to 25° C.

3. The centrifugal pendulum as claimed in claim 1, wherein the friction element is formed by a bimetal strip.

4. The centrifugal pendulum as claimed in claim 3, wherein the bimetal strip is formed U-shaped on a central region in the strip longitudinal direction, viewed in cross section in the strip longitudinal direction, wherein the bimetal strip is in a planar contact connection with the carrier flange element using a U base of this region, and wherein each outer region of the bimetal strip located outside the central U-shaped region, with an outer end region in the strip longitudinal direction, is brought into contact with an outer wall, facing away from the carrier flange element, of a corresponding pendulum element, when the centrifugal pendulum is in the defined temperature range.

5. The centrifugal pendulum as claimed in claim 3, wherein, if the centrifugal pendulum is not in the defined temperature range, the bimetal strip extends linearly, viewed in cross section in the strip longitudinal direction, at least up to outer end regions in the strip longitudinal direction and/or is in planar contact with the carrier flange element.

6. The centrifugal pendulum as claimed in claim 5, wherein the bimetal strip is accommodated and/or arranged in the carrier flange element thickness direction at least in regions in a recess, which is not continuous of the carrier flange element, and wherein if the centrifugal pendulum is not in the defined temperature range, the bimetal strip is completely accommodated and/or arranged in this recess at least up to outer end regions in the strip longitudinal direction.

7. The centrifugal pendulum as claimed in claim 1, wherein the friction element is formed having a defined high coefficient of thermal expansion, and wherein the friction element has a higher coefficient of thermal expansion than the at least one corresponding pendulum element and/or than the carrier flange element.

8. The centrifugal pendulum as claimed in claim 7, wherein the friction element is secured on the carrier flange element on a fastening region, rigidly and/or immovably, and wherein the friction element includes at least one arm, protruding from the fastening region in the circumferential direction, having a friction wall region, with which an outer wall, facing away from the carrier flange element, of a corresponding pendulum element is brought into contact when the centrifugal pendulum is in the defined temperature range.

9. The centrifugal pendulum as claimed in claim 1, wherein the friction element is formed by a bimetal strip.

10. The centrifugal pendulum as claimed in claim 9, wherein the bimetal strip is formed U-shaped on a central region in the strip longitudinal direction, viewed in cross section in the strip longitudinal direction, wherein the bimetal strip is in a planar contact connection with the carrier flange element using a U base of this region, and wherein each outer region of the bimetal strip located outside the central U-shaped region, with an outer end region in the strip longitudinal direction, is brought into contact with an outer wall, facing away from the carrier flange element, of a corresponding pendulum element, when the centrifugal pendulum is in the defined temperature range.

11. The centrifugal pendulum as claimed in claim 9, wherein, if the centrifugal pendulum is not in the defined temperature range, the bimetal strip extends linearly, viewed in cross section in the strip longitudinal direction, at least up to outer end regions in the strip longitudinal direction and/or is in planar contact with the carrier flange element.

12. The centrifugal pendulum as claimed in claim 11, wherein the bimetal strip is accommodated and/or arranged in the carrier flange element thickness direction at least in regions in a recess, which is not continuous of the carrier flange element, and wherein, if the centrifugal pendulum is not in the defined temperature range, the bimetal strip is completely accommodated and/or arranged in this recess at least up to outer end regions in the strip longitudinal direction.

13. The centrifugal pendulum as claimed in claim 1, wherein the friction element is formed having a defined high coefficient of thermal expansion, and wherein the friction element has a higher coefficient of thermal expansion than the at least one corresponding pendulum element and/or than the carrier flange element.

14. The centrifugal pendulum as claimed in claim 13, wherein the friction element is secured on the carrier flange element on a fastening region, rigidly and/or immovably, and wherein the friction element includes at least one arm, protruding from the fastening region in the circumferential direction, having a friction wall region, with which an outer wall, facing away from the carrier flange element, of a corresponding pendulum element is brought into contact when the centrifugal pendulum is in the defined temperature range.

15. A centrifugal pendulum for damping rotational irregularities of a driveshaft of an internal combustion engine, comprising:

a carrier flange element connectable indirectly or directly to the driveshaft, and multiple pendulum elements displaceable in relation to the carrier flange element, and guided via rollers in pendulum paths, wherein each pendulum element is displaceable in relation to the carrier flange element in the circumferential direction between a first and a second stop position, and wherein at least one friction element having defined thermal expansion properties, which are different from the carrier flange element and/or the pendulum element, is associated with at least one pendulum element and is designed and arranged in such a way that the pendulum element comes into contact with the carrier flange element upon a movement in the direction of a stop position before reaching the stop position in a defined temperature range of the centrifugal pendulum and rubs against the carrier flange element with the friction element while dissipating pendulum element movement energy.

16. A vehicle, comprising:

a centrifugal pendulum for damping rotational irregularities of a driveshaft of an internal combustion engine, wherein the centrifugal pendulum comprises:

a carrier flange element connectable indirectly or directly to the driveshaft, and multiple pendulum elements displaceable in relation to the carrier flange element, and guided via rollers in pendulum paths, wherein each pendulum element is displaceable in relation to the carrier flange element in the circumferential direction between a first and a second stop position, and wherein at least one friction element having defined thermal expansion properties, which are different from the carrier flange element and/or the pendulum elements, is associated with the carrier flange element and is designed and arranged in such a way that in a defined temperature range of the centrifugal pendulum, upon a movement of at least one pendulum element corresponding to the friction element in the direction of a stop position, this corresponding pendulum element comes into or is in contact with the friction element even before reaching the stop position and rubs against the friction element while dissipating pendulum element movement energy.

* * * * *